Patented Apr. 12, 1938

2,114,160

UNITED STATES PATENT OFFICE 2,114,160

MANUFACTURE OF BONDED ARTICLES

Maxwell L. Whitacre, Niagara Falls, N. Y., assignor, by mesne assignments, to The Carborundum Company, Niagara Falls, N. Y., a corporation of Delaware No Drawing. Application October 4, 1935, Serial No. 43,507

5 Claims. (Cl. 51—280)

This invention relates to an improved alkali silicate cement particularly adapted for the bonding of granular material such as abrasive grain into bonded articles such as abrasive wheels.

Alkali silicate cements are used in the bonding of granular material and for joining adjacent surfaces of larger elements which are to be cemented together. For example, sodium silicate cements have been used previously in the formation of bonded abrasive articles. As the use of abrasive articles bonded in this manner generally involves their exposure to moisture, the natural solubility of sodium silicate renders it necessary to modify the cement by the addition of materials which increase the resistance of the cement in the bonded articles to the deteriorating effect of water.

It has been the practice to add zinc oxide to a sodium silicate mix to improve the water resistance of the cement, but the results while representing an improvement are still unsatisfactory since sodium silicate cement thus modified still has a loss in strength after immersion in water of 20% to 40%.

It has also been the practice to add a proportion of an inert filler such as pulverized flint, clay, etc. to the mix to improve the structure of the bond matrix.

In connection with the present invention it has been discovered that the substitution in a mix for making a sodium silicate cement of one or more of certain oxides of metals, particularly in the second group of the periodic series of elements, for a portion of the zinc oxide, materially improves the wet strength of the cement and its resistance to the deteriorating effect of water.

Specifically it has been discovered that the replacement of a portion of the zinc oxide modifier by one or more of the following oxides, CuO, MgO, SrO, BaO, $Hg_2O$, $SiO_2$ (as diatomaceous earth), $TiO_2$, $Fe_3O_4$, $Co_2O_3$ and NiO, materially improves the strength and water resistance of the cement.

It will be noted that oxides of metals of the second group of the periodic series of elements predominate in the above list and it is found that these oxides are generally the most satisfactory as partial substitutes for zinc oxide.

The invention will be described with reference to specific examples employing the above oxides, but it will be understood that the invention is not limited by the proportions given in the said examples or the fact that one oxide only is used in each example. The use of other proportions of materials and combinations of oxides is within the contemplation of the invention, it being understood that the specific oxide or oxides used and the proportion thereof substituted will necessarily be varied to produce the best results depending upon the kind of alkali silicate used, its water content, and the ratio of the alkali oxide to $SiO_2$ in the silicate. The proportions of oxide for substitution for the best results will vary also depending upon the state of calcination of the oxide, the proportion and kind of impurities contained therein, and other factors which may only be determined in the actual practice of each embodiment of the invention.

In the following examples the sodium silicate used is of a variety commonly used in the manufacture of abrasive articles having a water content of about 46% and a ratio of $Na_2O$ to $SiO_2$ of 1:2 and the grain used is aluminum oxide of uniform grit size.

In connection with each of the following examples figures as to wet and dry strength are given for the purpose of illustrating the advantage obtained in the specific examples. These figures are obtained by forming ten 1" x 1" x 7" test bars according to the procedure given in the examples. After drying and curing five of the ten bars are broken to determine the modulus of rupture in the dry condition and the other five are soaked in water at room temperature for 16 hours and then broken while wet to determine the modulus of rupture in the wet condition.

Example I

Bonded abrasive articles may be made of a mix of the following formula:

| | Parts |
|---|---|
| Abrasive grain | 3600 |
| Pulverized flint | 40 |
| Zinc oxide | 90 |
| Cupric oxide | 30 |
| Sodium silicate | 240 |
| Water | 10 |

These ingredients are thoroughly mixed and molded into the desired shape under a pressure of 2500 lbs./sq. in. The molded piece is then dried at a temperature of 120° F. for 24 hours. After drying the article is given a regular open mold cure in the manner well known in the art.

Articles made according to the above procedure have a wet strength and a resistance to the deteriorating effect of water substantially superior to articles made without the use of the cupric oxide. For example, test pieces made according to the above formula and tested as described above exhibited a modulus of rupture in the dry condition of 1972 lbs./sq. in. and a modulus of rupture in the wet condition of 1749 lbs./sq. in., representing a loss of 11.3%, whereas test pieces made up by the same method except that the cupric oxide is replaced by zinc oxide exhibited a modulus of rupture in the dry condition of 2118 lbs./sq. in. and a modulus of rupture in the wet condition of 1640 lbs./sq. in. representing a loss of strength of 22.5%, substantially double that of the pieces made according to the new method. The comparison is even more favorable to the new mix when it is realized that even supposedly insoluble vitrified bonded articles lose 3 to 5% in strength on being immersed in water and tested in the wet condition.

*Example II*

Magnesium oxide may be used in carrying out the present invention according to the following formula:

| | Parts |
|---|---|
| Abrasive grain | 3600 |
| Pulverized flint | 40 |
| Zinc oxide | 105 |
| Magnesium oxide | 15 |
| Sodium silicate | 240 |
| Water | 10 |

After intimate mixing the ingredients are pressed into the desired shape and dried and cured as described under Example I. It will be found that articles made according to this example have a greater wet strength than articles made according to the prior process and very little loss in strength on immersion in water. For example, test pieces made according to this example and tested as described above exhibited a modulus of rupture in the dry condition of 1875 lbs./sq. in. and a modulus of rupture in the wet condition of 1756 lbs./sq. in. representing a loss in strength of 6.3% compared to the 22% loss exhibited by test pieces made according to the prior process.

*Example III*

Strontium oxide may be used in carrying out the invention according to the following formula:

| | Parts |
|---|---|
| Abrasive grain | 3600 |
| Pulverized flint | 40 |
| Zinc oxide | 105 |
| Strontium oxide | 15 |
| Sodium silicate | 240 |
| Water | 10 |

Articles are formed from this mix according to Example I and it will be found that they have substantially greater strength than articles made according to the method in which no strontium oxide and only zinc oxide is used, and substantially no loss in strength on immersion in water. For example, test pieces made according to this example and tested as described above exhibited a modulus of rupture in the dry condition of 2333 lbs./sq. in. and a modulus of rupture in the wet condition of 2300 lbs./sq. in., representing a loss of 1.4%.

Bonded articles of great strength and high resistance to the deteriorating effects of water may be made employing barium oxide as a partial substitute for zinc oxide in the formula in varying proportions.

*Example IV*

A small amount of barium oxide substituted for a like amount of zinc oxide gives substantial improvement in water resistance and strength. Articles made from the mix having the following formula:

| | Parts |
|---|---|
| Abrasive grain | 3600 |
| Pulverized flint | 40 |
| Zinc oxide | 105 |
| Barium oxide | 15 |
| Water | 10 |
| Sodium silicate | 240 | and pressed, dried and cured as described under Example I showed, when tested as described above, a modulus of rupture in the dry condition of 2310 lbs./sq. in. and a modulus of rupture in the wet condition of 2173 lbs./sq. in., representing a loss of 5.9%.

*Example V*

Increasing the quantity of barium oxide substituted for zinc oxide produces a still smaller loss in strength while maintaining the wet strength of the article. For example, articles made according to the following formula—

| | Parts |
|---|---|
| Abrasive grain | 3600 |
| Pulverized flint | 40 |
| Zinc oxide | 90 |
| Barium oxide | 30 |
| Sodium silicate | 240 |
| Water | 10 | and dried and cured as described under Example I exhibited a modulus of rupture in the dry condition of 1947 lbs./sq. in. and a modulus of rupture in the wet condition of 2027 lbs./sq. in., representing a gain of 1%.

It will be understood of course that the other ingredients of the mix may be varied to produce finished articles of varying characteristics without departing from the scope of the invention. The ratio of bond to granular material, the ratio of modifying ingredients to sodium silicate in the bond, and the relationship of the various ingredients of the modifier, may be varied to obtain abrasive wheels of varying characteristics but of uniformly high strength and high water resistance.

For example the ingredients of the modifier may be varied with relation to each other to produce uniformly good results as to strength and water resistance in the finished product. In connection with the use of barium oxide in the modifier it is found in the above formula using 10% of bond, of which 40% is a modifier for the sodium silicate consisting of pulverized flint, barium oxide and zinc oxide, that the ingredients of the modifier may be varied within the following limits in producing articles of high wet strength and low loss in strength on immersion in water:

| | Percent |
|---|---|
| Pulverized flint | 22 to 35 |
| Barium oxide | 15 to 27 |
| Zinc oxide | 47 to 70 |

Mercurous oxide may also be used as a partial substitute for zinc oxide with beneficial results.

Example VI

Articles of improved resistance to water and high strength may be obtained using mercurous oxide in the following formula:

| | Parts |
|---|---|
| Abrasive grain | 3600 |
| Pulverized flint | 40 |
| Zinc oxide | 90 |
| Mercurous oxide | 30 |
| Sodium silicate | 240 |
| Water | 10 |

Articles made from this formula as described under Example I and tested as described above exhibited a modulus of rupture in the dry condition of 2146 lbs./sq. in. and a modulus of rupture in the wet condition of 1899 lbs./sq. in., representing a loss of 11.5%.

Diatomaceous earth, an amorphous form of silica, also produces beneficial results as a partial substitute for zinc oxide.

Example VII

Diatomaceous earth may be used as in the following formula:

| | Parts |
|---|---|
| Abrasive grain | 3600 |
| Pulverized flint | 40 |
| Zinc oxide | 105 |
| Diatomaceous earth | 15 |
| Sodium silicate | 240 |
| Water | 10 |

Articles made from this formula as described under Example I and tested as above exhibited a modulus of rupture in the dry condition of 1864 lbs./sq. in. and a modulus of rupture in the wet condition of 1728 lbs./sq. in., representing a loss of 7.3%.

Titanium oxide may also be used as a partial substitute for zinc oxide with beneficial results.

Example VIII

Titanium oxide may be used as in the following formula:

| | Parts |
|---|---|
| Abrasive grain | 3600 |
| Pulverized flint | 40 |
| Zinc oxide | 90 |
| Titanium oxide | 30 |
| Sodium silicate | 240 |
| Water | 10 |

Articles made from this formula as described above and tested as described above exhibited a modulus of rupture in the dry condition of 2470 lbs./sq. in. and a modulus of rupture in the wet condition of 2051 lbs./sq. in., representing a loss of 17%.

Magnetic iron oxide (ferriferrous oxide, ferrosoferric oxide, or $Fe_3O_4$) may be used as a partial substitute for zinc oxide in the mix.

Example IX

Magnetic iron oxide may be used according to the following formula:

| | Parts |
|---|---|
| Abrasive grain | 3600 |
| Pulverized flint | 40 |
| Zinc oxide | 60 |
| $Fe_3O_4$ | 60 |
| Sodium silicate | 240 |
| Water | 10 |

Articles made of the above formula according to the method described under Example I and tested as described above exhibited a modulus of rupture in the dry condition of 2376 lbs./sq. in. and a modulus of rupture in the wet condition of 2033 lbs./sq. in. representing a loss of 14.4%.

Cobaltic oxide ($Co_2O_3$) may be used as a partial substitute for zinc oxide to improve the strength and water resistance of silicate bonded articles.

Example X

Cobaltic oxide may be used according to the following formula:

| | Parts |
|---|---|
| Abrasive grain | 3600 |
| Pulverized flint | 40 |
| Zinc oxide | 90 |
| Cobaltic oxide | 30 |
| Sodium silicate | 240 |
| Water | 10 |

Articles made according to this formula and following the procedure outlined under Example I and tested as described above exhibited a modulus of rupture in the dry condition of 1714 lbs./sq. in. and a modulus of rupture in the wet condition of 1895 lbs./sq. in. representing a gain of 9.4% in strength.

Nickel monoxide (NiO) may also be used as a partial substitute for zinc oxide in the silicate bond formula with beneficial results.

Example XI

Nickel monoxide may be used according to the following formula:

| | Parts |
|---|---|
| Abrasive grain | 3600 |
| Pulverized flint | 40 |
| Zinc oxide | 105 |
| Nickel monoxide | 15 |
| Sodium silicate | 240 |
| Water | 10 |

Articles made of this formula following the procedure outlined under Example I and tested as described above exhibited a modulus of rupture in the dry condition of 1755 lbs./sq. in. and a modulus of rupture in the wet condition of 1567 lbs./sq. in., representing a loss of 10.7%.

The invention thus provides a means for improving the production of silicate bonded materials as to the wet and dry strength and as to the loss in strength on immersion in water. The strength of the bonded article will depend somewhat upon the proportion of bond in the article as well as upon the character of the bond. However a bond which will produce a bonded article having a higher unit strength than another bond when used in the same proportions is superior in that it permits the production of more efficient abrasive articles. The smaller the amount of bond required to produce the same strength, the smaller will be the amount of bond interference in the action of the abrasive particles. Furthermore a small loss in strength on immersion in water is valuable in making for more uniform grinding action even though the wet strength be no higher than with bonds having a higher loss of strength on immersion in water.

The invention therefore provides a means for producing silicate bonded articles, particularly abrasive articles, having improved grinding characteristics thereby measurably increasing their value and field of use.

I claim:

1. A bonded abrasive article comprising abrasive grain and a bond therefor consisting essentially of the thermal reaction products of an alkali silicate and a modifier comprising zinc oxide, pulverized flint, and an oxide of the group consisting of CuO, MgO, SrO, BaO, Hg$_2$O, TiO$_2$, Fe$_3$O$_4$, Co$_2$O$_3$, NiO and amorphous SiO$_2$.

2. A bonded abrasive article comprising abrasive grain and a bond therefor consisting essentially of the thremal reaction products of sodium silicate and a modifier comprising zinc oxide, pulverized flint, and an oxide of the group consisting of CuO, MgO, SrO, BaO, Hg$_2$O, TiO$_2$, Fe$_3$O$_4$, Co$_2$O$_3$, NiO and amorphous SiO$_2$.

3. A bonded abrasive article comprising abrasive grain and a bond therefor consisting essentially of the thermal reaction products of an alkali silicate and a modifier comprising zinc oxide, pulverized flint, and magnesium oxide.

4. A bonded abrasive article comprising abrasive grain and a bond therefor consisting essentially of the thermal reaction products of an alkali silicate and a modifier comprising zinc oxide, pulverized flint, and strontium oxide.

5. A bonded abrasive article comprising abrasive grain and a bond therefor consisting essentially of the thermal reaction products of an alkali silicate and a modifier comprising zinc oxide, pulverized flint, and barium oxide.

MAXWELL L. WHITACRE.